United States Patent
Thor

(10) Patent No.: US 7,647,915 B2
(45) Date of Patent: Jan. 19, 2010

(54) SYSTEM FOR CONTROLLING FUEL INJECTORS

(75) Inventor: Todd J. Thor, Byron, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/738,939

(22) Filed: Apr. 23, 2007

(65) Prior Publication Data

US 2008/0257305 A1    Oct. 23, 2008

(51) Int. Cl.
*F02D 41/30* (2006.01)
(52) U.S. Cl. ................................ 123/344; 701/104
(58) Field of Classification Search ................. 701/104, 701/110, 115; 123/480, 486
See application file for complete search history.

(56) References Cited

U.S. PATENT DOCUMENTS

| | | | | |
|---|---|---|---|---|
| 6,202,629 | B1* | 3/2001 | Zhu et al. | 123/339.21 |
| 6,962,140 | B1* | 11/2005 | Nakai et al. | 123/436 |
| 6,990,950 | B2* | 1/2006 | Asano et al. | 123/299 |
| 7,021,288 | B2* | 4/2006 | Asano et al. | 123/435 |
| 7,258,102 | B2* | 8/2007 | Kinose et al. | 123/431 |
| 2004/0267433 | A1* | 12/2004 | Asano et al. | 701/104 |

* cited by examiner

*Primary Examiner*—Stephen K Cronin
*Assistant Examiner*—Johnny H Hoang

(57) ABSTRACT

An injector control system and method for an engine includes a distribution module that calculates a difference between a first average engine speed and a second average engine speed of an engine and a fuel offset module that offsets a learned fuel amount of a first fuel injector of a plurality of fuel injectors based on the difference. The learned fuel amount corresponds to an engine fueling range.

6 Claims, 3 Drawing Sheets

SYSTEM FOR CONTROLLING FUEL INJECTORS

FIELD OF THE INVENTION

The present disclosure relates to internal combustion engines, and more particularly to control systems for fuel injectors.

BACKGROUND OF THE INVENTION

The statements in this section merely provide background information related to the present disclosure and may not constitute prior art.

Fuel and air injection quantities delivered to an engine are controlled to meet fuel economy requirements and emission standards. Closed loop control systems sense oxygen levels in exhaust flowing from the engine in order to control air and fuel quantities flowing into the engine.

When engine components such as fuel injectors function improperly, fuel injection quantities delivered to the engine may vary from desired levels. Variations and/or degradation among the fuel injectors may result in inaccurate fuel injection quantities being delivered to the engine. The delivery of inaccurate fuel injection quantities to the engine may increase emissions and/or decrease fuel economy.

SUMMARY

Further areas of applicability will become apparent from the description provided herein. It should be understood that the description and specific examples are intended for purposes of illustration only and are not intended to limit the scope of the present disclosure.

An injector control system and method for an engine includes a distribution module that calculates a difference between a first average engine speed and a second average engine speed of an engine and a fuel offset module that offsets a learned fuel amount of a first fuel injector of a plurality of fuel injectors based on the difference. The learned fuel amount corresponds to an engine fueling range.

In other features, the distribution module maintains current fueling quantities of the plurality of fuel injectors. The distribution module determines the first average engine speed. The distribution module distributes an injector fuel removal amount removed from the first fuel injector to other fuel injectors of the plurality of injectors. The distribution module determines the second average engine speed after the distribution of the injector fuel removal amount.

In other features, the control system further comprises an activation module that enables the control system when the activation module determines that the engine is operating at a steady-state operating point. The activation module determines that the engine is operating at a steady-state condition based on a set of stability conditions that include at least one of an engine coolant temperature exceeding a calibrated engine coolant temperature, a torque output demand on the engine remaining stable for a first period of time, and the control system remaining inactive for a second period of time.

In other features, the distribution module determines the first and second average engine speeds based on a calibrated number of revolutions of the engine and the distribution module reads the fuel removal amount from a fuel removal array based on a speed variation of the engine. The fuel offset module compares the difference to an engine speed variation value read from an engine speed variation array and the fuel offset module decrements a fueling level value when the difference exceeds the engine speed variation value and increments the fueling level value when the difference is less than the engine speed variation value. The distribution module releases control of the current fueling quantities of the plurality of fuel injectors.

In other features, the fuel offset module increments an injector sample value and the fuel offset module adjusts the learned fuel amount when the injector sample value exceeds a sample threshold. The fuel offset module subtracts a calibrated fuel amount from the learned fuel amount when the fueling level value falls below a fueling level threshold and the fuel offset module adds the calibrated fuel amount to the learned fuel amount when the fueling level exceeds the fueling level threshold. The fuel offset module adds the learned fuel amount to a desired fueling quantity of the first fuel injector at the engine fueling range.

DRAWINGS

The drawings described herein are for illustration purposes only and are not intended to limit the scope of the present disclosure in any way.

DETAILED DESCRIPTION

Figure 1:
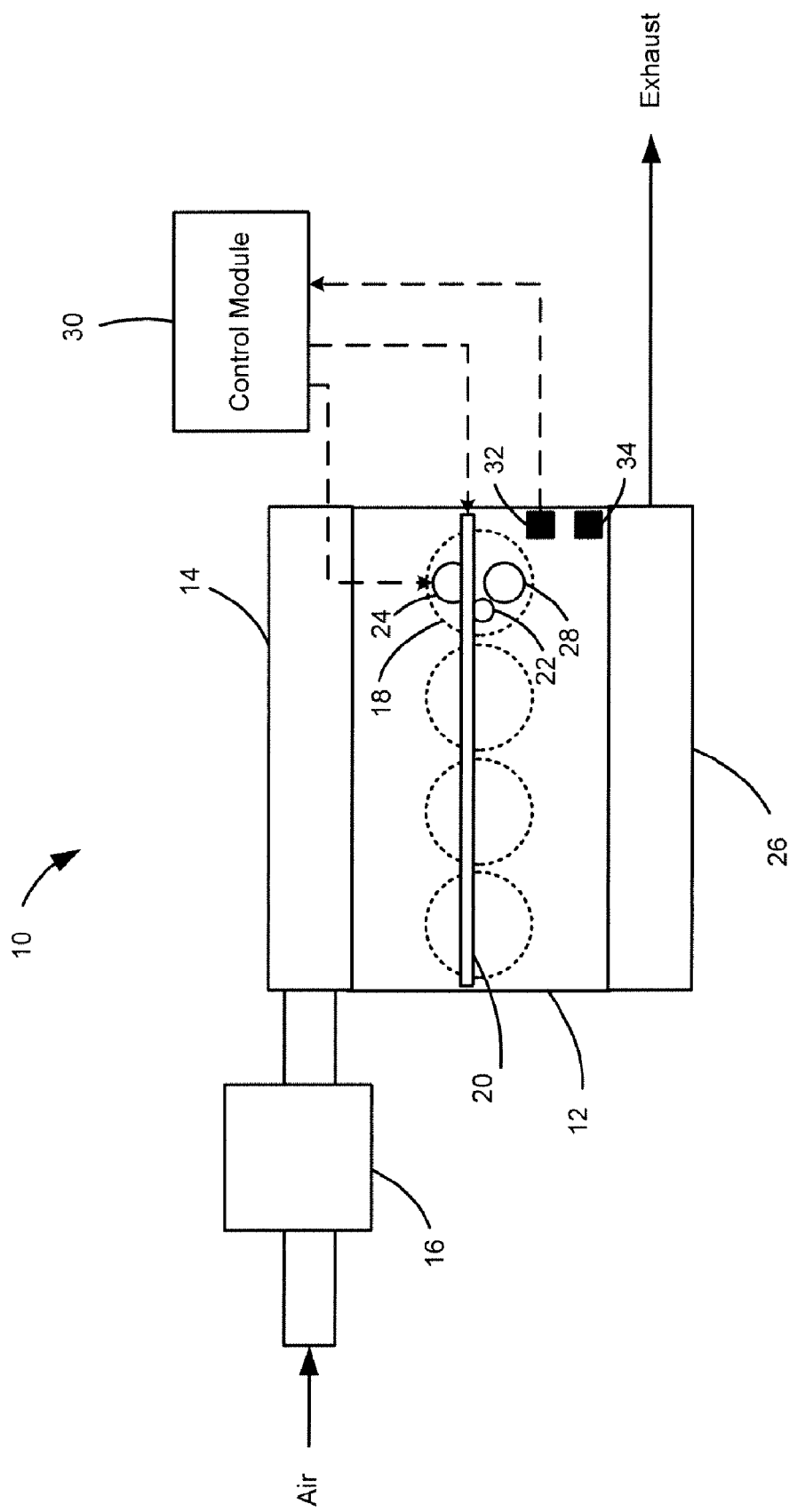
FIG. 1 is a functional block diagram of an exemplary diesel fuel injection system according to the present invention.

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary engine system 10 includes an engine 12 that combusts an air and fuel mixture to produce drive torque. Air is drawn into an intake manifold 14 through a compressor 16. Air within the intake manifold 14 is distributed into cylinders 18. Although four cylinders 18 are illustrated, it can be appreciated that the engine system can be implemented in diesel engines having a plurality of cylinders including, but not limited to, 2, 3, 5, 6, 8, 10, 12 and 16 cylinders.

Air is drawn into the cylinder 18 through an intake port. A fuel rail 20 supplies fuel to fuel injectors 22. The fuel injector 22 directly injects fuel into the cylinder 18. An intake valve 24 selectively opens and closes to enable air to enter the cylinder 18. A piston (not shown) compresses the air/fuel mixture within the cylinder 18. Heat from the compressed mixture ignites the fuel generating force to drive the piston. The piston drives a crankshaft (not shown) to produce drive torque.

Combustion exhaust within the cylinder 18 is forced out through an exhaust manifold 26 when an exhaust valve 28 is in an open position. Exhaust is treated in an exhaust system (not shown). Although single intake and exhaust valves 24 and 28 are illustrated, it can be appreciated that the engine 12 can include multiple intake and exhaust valves 24 and 28 per cylinder 18.

A control module 30 determines and controls a fuel injection quantity to be supplied to each cylinder 18 based on engine operating conditions. The control module 30 communicates with various components of the engine system 10 including, but not limited to, an engine speed sensor 32 and an engine coolant temperature sensor 34. The engine speed sensor 32 is responsive to a rotational speed of the engine 12 and generates an engine speed signal in revolutions per minute (RPM). The coolant temperature sensor 34 senses the coolant temperature within the engine 12 and generates a coolant temperature signal indicating an operating temperature of the engine 12. The control module 30 determines an operating point of the engine 12 based on at least one of the engine speed signal, the Tcool signal, and a fuel demand level of the engine 12.

An injector control system of the present disclosure supplies learned fuel amounts to offset the desired fueling quantity of each of the fuel injectors 22 at various fueling ranges of the engine 12, thereby compensating for physical and functional variations and/or degradation of the injectors 22 that typically result in over or under fueling. Although an injector control system is shown operating in a diesel engine 12, those skilled in the art will appreciate that the present disclosure contemplates the use of the injector control system in an internal combustion engine.

Figure 2:
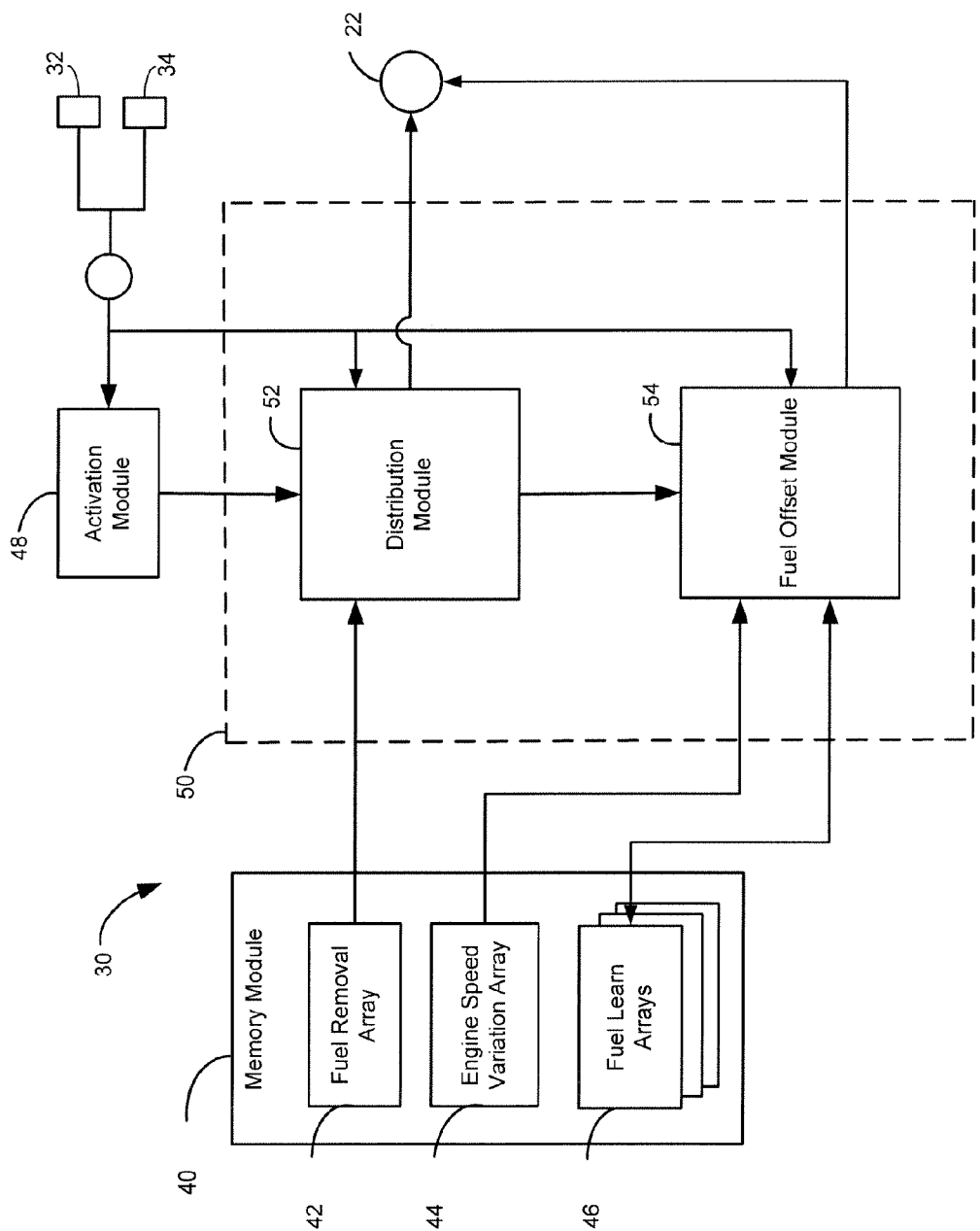
FIG. 2 is a functional block diagram illustrating an exemplary module that executes the control system of the present invention.

Referring now to FIG. 2, the control module 30 includes a memory module 40. The memory module 40 includes a fuel removal array 42, an engine speed variation array 44, and fuel learn arrays 46. The fuel removal array 42 stores a set of injector fuel amounts based on engine speed variation over a calibrated number of revolutions of the engine 12. The engine speed variation array 44 stores engine speed variation values based on engine operation conditions that include, but are not limited to, desired fueling ranges of the engine 12 and engine speed. The fuel learn arrays 46 store "learned" fuel amounts for the fuel injectors 22 calculated by an injector control system 50.

The control module 30 supplies the learned fuel amounts to offset the desired fueling quantity of the fuel injectors 22 at various fueling ranges of the engine 12. In the present implementation, the control module 30 stores one of the fuel learn arrays 46 for each of the fuel injectors 22. Additionally, each of the fuel learn arrays 46 include a plurality of cells respectively associated with each fueling range of the engine 12.

An activation module 48 communicates with the engine speed sensor 32 and the engine coolant temperature sensor 34. The activation module 48 determines whether the engine 12 is operating at a steady-state operating point by checking three stability conditions: (1) whether the engine coolant temperature exceeds a calibrated engine coolant temperature; (2) whether the torque output demanded by a driver/operator of the engine system 10 remains stable for a period of time; and (3) whether the injector control system 50 has remained inactive for a period of time. If all three conditions are met, the activation module 48 enables the injector control system 50.

The injector control system 50 includes a distribution module 52 and a fuel offset module 54. The injector control system 50 operates on each of the fuel injectors 22 individually and in identical fashion. In the present implementation, the injector control system 50 cycles through each of the fuel injectors 22 during a single operating cycle of the injector control system 50 as described below.

The distribution module 52 "freezes", or maintains, the current fueling quantities of each of the fuel injectors 22 and determines a first average engine speed over a calibrated number of revolutions of the engine 12. The distribution module 52 then reads an injector fuel removal amount from the fuel removal array 42 based on a current speed variation of the engine 12 determined by the distribution module 52. The distribution module 52 transmits a fuel removal command to remove the injector fuel removal amount from a first fuel injector of the fuel injectors 22. The distribution module 52 equally distributes the injector fuel removal amount to other fuel injectors of the fuel injectors 22.

The distribution module 52 determines a second average engine speed experienced by the engine system 10 after the injector fuel removal amount is distributed to the other fuel injectors 22. In the present implementation, the distribution module 52 calculates the second average engine speed over the calibrated number of revolutions. Preferably, during the calibrated number of revolutions, the engine system 10 does not respond to changes in speed (i.e. torque output) demanded by the driver/operator. The distribution module 52 calculates a difference between the first and second average engine speeds.

The fuel offset module 54 compares an absolute value of the difference in average engine speeds to a corresponding engine speed variation value read from the engine speed variation array 44. In the present implementation, the engine speed variation values can be calibrated. If the absolute value exceeds the engine speed variation value, the fuel offset module 54 determines whether the second average engine speed exceeds the first average engine speed. If the second average engine speed exceeds the first average engine speed, the fuel offset module 54 determines that the first fuel injector is operating in an under fueling state at the current desired fueling range and increments a fueling level value. If the second average engine speed falls below the first average engine speed, the fuel offset module 54 determines that the first fuel injector is operating in an over fueling state at the current desired fueling range and decrements the fueling level value.

The fuel offset module 54 then increments an injector sample value and determines whether the injector sample value exceeds a calibrated sample threshold. If the injector sample value exceeds the sample threshold, the fuel offset module 54 adjusts a learned fuel amount associated with the first fuel injector at the current desired fueling range based on the fueling level value. If an absolute value of the fueling level value exceeds a fueling level threshold, the fuel offset module 54 determines whether the fueling level value exceeds a fueling level threshold. If the fueling level value exceeds a fueling level threshold, the fuel offset module 54 adds a calibrated fuel amount to the learned fuel amount. If the fueling level value falls below the fueling level threshold, the fuel offset module 54 subtracts the calibrated fuel amount from the learned fuel amount.

Upon adjusting the learned fuel amount of the first fuel injector, the fuel offset module 54 adds the learned fuel amount to the desired fueling quantity at the current fueling range of the first fuel injector. The distribution module releases control over the fueling quantities of the fuel injectors 22. The fuel offset module 54 proceeds to clear the values of the sample value and the fueling level value of the first fuel injector. In other words, the fuel offset module 54 adjusts the learned fuel amount supplied to the first fuel injector based on whether the first fuel injector is over fueling or under fueling at a current desired fueling range.

In the present implementation, the injector control system 50 operates on each of the fuel injectors 22 consecutively.

Additionally, the injector control system 50 remains inactive for a period of time between operations of the injector control system 50.

Figure 3:
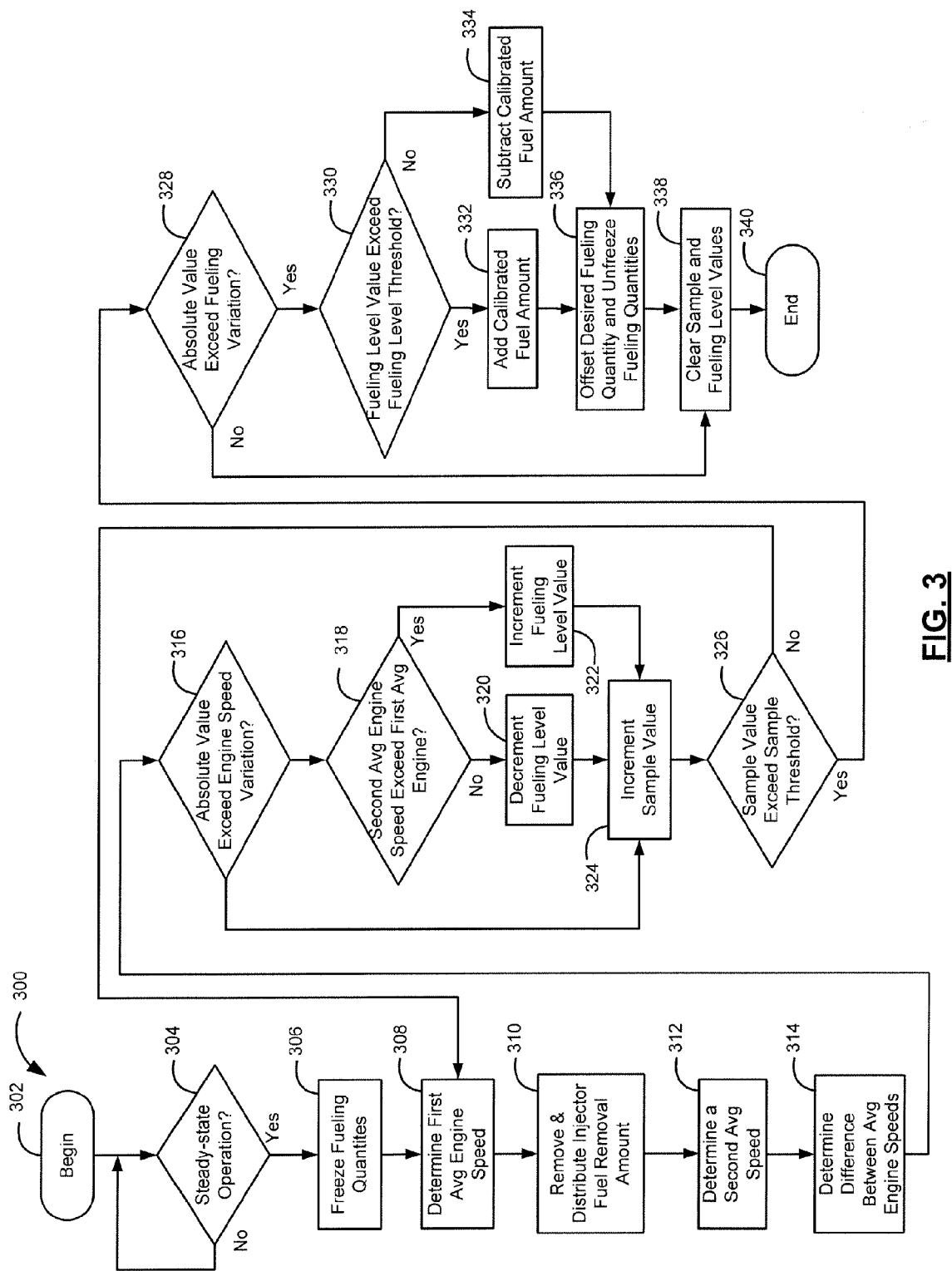
FIG. 3 is a flowchart illustrating the control system of the present invention.

Referring now to FIG. 3, an exemplary method 300 for operating the injector control system 50 will be described in more detail. The method 300 is executed for each of the fuel injectors 22. Control begins the method 300 at step 302. In step 304, control determines whether the engine 12 is operating at a steady-state operating point. If the engine 12 is not operating at steady-state operating point, the method 300 returns to step 304. If the engine 12 is operating at a steady-state operating point, control proceeds to step 306. In step 306, control freezes the fueling quantities of the injectors 22. In step 308, control determines a first average engine speed of the engine 12. In step 310, control removes an injector fuel amount from a first injector and distributes the injector fuel amount to the other fuel injectors of the fuel injectors 22.

In step 312, control determines a second average engine speed of the engine 12. In step 314, control determines a difference between the first and second average engine speeds. In step 316, control determines whether an absolute value of the difference between the first and second average engine speeds exceeds an engine speed variation value. If the absolute value exceeds the engine speed variation value, control proceeds to step 318. In step 318, control determines whether second average engine speed exceeds the first average engine speed. If the second average engine speed falls below the first average engine speed, control decrements a fueling level value in step 320. If the second average engine speed exceeds the first average engine speed, control increments the fueling level value in step 322.

In step 324, control increments a sample value. In step 326, control determines whether the sample value exceeds a sample threshold. If the sample value does not exceed the sample threshold, control returns to step 308. If the sample value does exceed the sample threshold, control proceeds to step 328. In step 328, control determines whether an absolute value of the fueling level value exceeds a fueling variation. If the absolute value does not exceed the fueling variation, control proceeds to step 340. If the absolute value does exceed the fueling variation, control proceeds to step 330. In step 330, control determines whether the fueling level value exceeds a fueling threshold (e.g. zero). If the fueling exceeds the fueling threshold, control adds a calibrated fuel amount to a learned fuel amount for the first injector at the current fueling range in step 332. If the fueling level value falls below the fueling threshold, control subtracts the calibrated fuel amount from the learned fuel amount. In step 336, control unfreezes the fueling quantities of the fuel injectors 22 and offsets the desired fueling quantity of the first injector with the learned fuel amount. In step 338, control clears the sample and fueling level values associated with the first fuel injector at the current fueling range. In step 340, the method 300 ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An injector control system for an engine, comprising:
a distribution module that calculates a difference between a first average engine speed and a second average engine speed of an engine;
a fuel offset module that offsets a learned fuel amount of a first fuel injector of a plurality of fuel injectors based on said difference; and
an activation module that enables said control system when said activation module determines that said engine is operating at a steady-state operating point,
wherein said learned fuel amount corresponds to an engine fueling range, and
wherein said activation module determines that said engine is operating at a steady-state condition based on a set of stability conditions that include at least one of an engine coolant temperature exceeding a calibrated engine coolant temperature, a torque output demand on said engine remaining stable for a first period of time, and said control system remaining inactive for a second period of time.

2. An injector control system for an engine, comprising:
a distribution module that calculates a difference between a first average engine speed and a second average engine speed of an engine;
a fuel offset module that offsets a learned fuel amount of a first fuel injector of a plurality of fuel injectors based on said difference; and
wherein said learned fuel amount corresponds to an engine fueling range,
wherein said fuel offset module compares said difference to an engine speed variation value read from an engine speed variation array and said fuel offset module decrements a fueling level value when said difference exceeds said engine speed variation value and increments said fueling level value when said difference is less than said engine speed variation value,
wherein said fuel offset module increments an injector sample value and said fuel offset module adjusts said learned fuel amount when said injector sample value exceeds a sample threshold, and
wherein said fuel offset module subtracts a calibrated fuel amount from said learned fuel amount when said fueling level value falls below a fueling level threshold and said fuel offset module adds said calibrated fuel amount to said learned fuel amount when said fueling level exceeds said fueling level threshold.

3. The control system of claim 2 wherein said fuel offset module adds said learned fuel amount to a desired fueling quantity of said first fuel injector at said engine fueling range.

4. A method for controlling a fuel injector in an engine, comprising:
calculating a difference between a first average engine speed and a second average engine speed of an engine;
offsetting a learned fuel amount of a first fuel injector of a plurality of fuel injectors based on said difference;
enabling said method when said engine operates at a steady-state operating point; and
determining that said engine is operating at a steady-state condition based on a set of stability conditions that include at least one of an engine coolant temperature exceeding a calibrated engine coolant temperature, a torque output demand on said engine remaining stable for a first period of time, and said control system remaining inactive for a second period of time, wherein said learned fuel amount corresponds to an engine fueling range.

5. A method for controlling a fuel injector in an engine, comprising:
calculating a difference between a first average engine speed and a second average engine speed of an engine; and offsetting a learned fuel amount of a first fuel injector of a plurality of fuel injectors based on said difference;

comparing said difference to an engine speed variation value read from an engine speed variation array and decrementing a fueling level value when said difference exceeds said engine speed variation value and incrementing said fueling level value when said difference is less than said engine speed variation value;

incrementing an injector sample value and adjusting said learned fuel amount when said injector sample value exceeds a sample threshold; and subtracting a calibrated fuel amount from said learned fuel amount when said fueling level value falls below a fueling level threshold and adding said calibrated fuel amount to said learned fuel amount when said fueling level exceeds said fueling level threshold, wherein said learned fuel amount corresponds to an engine fueling range.

6. The method of claim 5 further comprising adding said learned fuel amount to a desired fueling quantity of said first fuel injector at said engine fueling range.

\* \* \* \* \*